Patented Sept. 11, 1923.

1,467,654

UNITED STATES PATENT OFFICE.

ARTHUR W. SCOLES, OF TULSA, OKLAHOMA.

COMPOSITION FOR REMOVING PAINT.

No Drawing. Application filed September 6, 1921. Serial No. 498,612.

*To all whom it may concern:*

Be it known that I, ARTHUR W. SCOLES, a citizen of the United States, residing at Tulsa, in the county of Tulsa and State of Oklahoma, have invented certain new and useful Improvements in Compositions for Removing Paint, of which the following is a specification.

The object of the present invention is to provide a novel composition for employment in removing paint, and particularly paint from the bodies of automobiles, although the composition of the present invention is not limited to such use.

One of the objects of the present invention is to provide a paint removing composition which will be quick and effective in its action and which will not only completely remove all paint from the surface to which it is applied but will furthermore serve to cleanse the surface and remove therefrom any oily accumulation, thus preparing the surface for the application of a fresh coat of paint.

Another object of the invention is to provide a composition for the purpose stated adapted to be placed upon the market in powdered form and to be mixed in suitable quantities with water and the solution then applied to the surface from which the paint is to be removed, thus obviating the expense and inconvenience attending the use of liquid containers.

The composition embodying the present invention consists of a dry mixture in powdered form of sodium hydroxide ninety per cent and ammonium carbonate ten per cent.

In using the composition, a suitable quantity thereof is mixed with water and the solution is swabbed, by the use of waste or cloth, over the surface to be treated, after which the treated surface is permitted to stand for a period of from one to four hours whereupon the paint may be readily washed off from the surface by the use of an ordinary hose. Preferably I add about one pound of the mixture to one-half gallon of water although it will be understood that these relative proportions may be varied if found desirable.

The composition will, as before stated, not only remove paint from a surface to which it is applied but it will also serve as detergent and will remove all dirt and oily accumulations from the surface thus preparing it for the application of fresh coat of paint.

Having thus described the invention, what is claimed as new is:

A paint removing composition comprising a dry mixture of sodium hydroxide ninety per cent, and ammonium carbonate ten per cent.

In testimony whereof I affix my signature.

ARTHUR W. SCOLES. [L. S.]